United States Patent Office 2,875,061
Patented Feb. 24, 1959

2,875,061

PREPARATION OF PROTEIN PRODUCTS FROM FISH MATERIALS

Raimund Vogel, Munich, and Klement Mohler, Tutzing am Starnberger See, Germany

No Drawing. Application May 31, 1955
Serial No. 512,327

Claims priority, application Germany May 31, 1954

8 Claims. (Cl. 99—7)

This invention relates to processes for preparing protein products from fish and other sea animal materials for use as food, fodder and like nutrients.

It is an object of the present invention to provide means facilitating extraction of protein products from raw fish materials in such a manner as to rid said products of all disagreeable odoriferous substances while retaining in said products the beneficial amino constituents, such as the sulphurous amino acids, to the greatest possible extent.

It is another object of the present invention to provide means affording facile and efficient production of protein products from raw fish materials, the water content of the protein products being reduced to a minimum.

Another object of the present invention is to provide means conducive to simplified yet highly efficacious processes for obtaining protein products of extremely high nutritive values from raw fish materials, and substantially avoid destruction of essential amino compounds (in particular sulphurous amino products) contained in said materials.

A further object of the present invention is the provision of means facilitating the preparation of dehydrated protein products of maximum swelling capacity from raw fish materials, whereby fresh dehydrated products, upon being immersed in water, may attain a volume substantially approaching that of fresh protein products.

The process according to the present invention has the concept of employing raw fish material whose fat component has been reduced to 0.5 to 4%, or possibly to a greater extent, by extraction of the fat through use of an organic solvent. Then the fish material is subjected to treatment in a solution of an alkali hydroxide such as sodium hydroxide or potassium hydroxide in an organic solvent such as ethanol or acetone at a temperature preferably between 20° C. and 80° C. until all disturbing odoriferous and ill tasting substances are split up or destroyed to eliminate fishy taste and smell. This preliminary treatment is preferably carried out in a vacuum. The preliminary treatment can also be carried out with other organic solvents having higher boiling points at a temperature up to the boiling point at atmospheric pressure of the solvent used, and with a correspondingly shorter period of treatment.

The principle of the present invention resides in the employment of a suitable compound (alkaline or acidic in nature), which is substantially soluble in a water soluble organic solvent, whereby the resultant treatment substance displaces through diffusion water in the cells of the fish material, and through hydrolysis the compound dissolved in the solvent acts on the starting fish material and protein-like constituents thereof.

In the process according to the present invention, the alkali hydroxide may be replaced by other compounds of alkali metals, such as calcium, magnesium, or by compounds of ammonium, in so far as they have an alkaline reaction due to hydrolysis.

An essential feature of the process is that the addition of water to the fish material is avoided. It is advantageous to reduce the natural water content of the starting or raw fish material to about 50% or even to below 5% by pre-drying in vacuum or by some other method, such as by displacement through application of organic solvents. In the absence of such pre-treatment, the water content of the raw material in the process according to the invention itself may be continuously reduced gradually.

The alkali hydroxide is used in concentrations of 1 to 10% based on the raw protein contained in said starting material.

According to another method of carrying out the invention, the raw fish material is treated with an acid dissolved in an organic solvent such as ethanol, at temperatures of about 55° C., but in every case below the boiling point of the solvent (at atmospheric pressure) until the disturbing taste and odor components are eliminated. In the process the acid can be replaced by compounds of alkali metals, such as calcium or magnesium, or of ammonium, which have an acid reaction due to hydrolysis, and/or by gases which will produce acid in the water present. The concentration of acid employed corresponds to the above-mentioned concentration of alkali employed.

Following the alkali or acid treatment of the partially dehydrated material, the isoelectric point of the protein present is obtained by the addition of suitable salts, acids or alkalis; for example, hydrochloric acid. Thereafter, the liquid components are removed mechanically, for example by pressing or centrifuging and/or by wet-washing with the same or some other water-soluble organic solvent and subsequently drying (under vacuum or by some other known method) at a temperature preferably below 60° C., so that the ultimate protein preparation is obtained in dry state.

Alkali and acid treatment can advantageously be combined in any sequence and, if desired, in repeated alternation. Particularly, ethanol and acetone are well suited for use as organic solvents. These can be used separately or mixed or one after the other in any sequence in the alkali or acid treatment and/or the subsequent washing operation. To increase the effect of the subsequent or final washing operations, one or more drying stages can be introduced before the pressing out or final washing with organic solvents.

All the liquid treatments described are assisted by simultaneous intensive stirring of the material being treated. For this purpose all procedures and devices which effect a thorough mechanical agitation and mixing are suitable.

The starting or raw fish materials with respect to which the processes according to the present invention may be carried out with great advantage are:

(a) *Fat fish (herrings, pilchards, and the like)*

The material is subjected to extraction treatment to reduce the fat content to about 0.5 to 4% or less with organic solvents such as benzene, methylene chloride, trichlorethylene, and is subsequently, if desired, dried to a water content of about 8% (through direct drying with hot gases, indirect drying, infra-red drying, vacuum drying, and like treatments, or by the use of selected organic solvents).

(b) *Lean fish (cod, sea-salmon, and the like)*

The material is ground, preferably pre-degreased and, if desired, pre-dried (as above stated).

(c) *Fish meal*

Ordinary commercial fish meals can be treated. In the event that such meal contains more than 4% fat, a preliminary extraction with water soluble organic solvent or solvents is carried out, or the quantity of caustic alkali used in the process according to the invention is increased to such an extent that it is sufficient for the saponification of the excess fat.

The following examples carried out in a laboratory will serve to illustrate more particularly some of the fundamental aspects of the present invention.

(1) 100 grams of finely disintegrated fresh sea water fish with a pH-value of between 5 and 6, for example fillet of cod, are freed through extraction from at least 60% of their total initial water by the addition of about 100 cc. ethanol. The moist resultant alcohol product is boiled with a solution of about 1 gram of sodium hydroxide in 150 cc. of ethanol for about 30 minutes, evaporated ethanol being returned and reused in well known manner and the mixture being constantly stirred. When cool, the isoelectric point is obtained by adding an adequate quantity of hydrochloric acid. The solvent is then removed by filtration or centrifuging. Thereupon the resultant material may be repeatedly washed with additional quantities of ethanol and is finally dried under vacuum. A powder is obtained which, depending on the starting fish material, is almost white, taste and smell being neutralized to such extent that the powder is readily employable for food purposes.

(2) 20 grams of sea water fish meal with about 4% fat content, after being boiled with 200 grams of ethanol for one hour to effect partial dehydration, are boiled with a solution of 1 gram of sodium hydroxide in 150 cc. of ethanol for approximately 30 minutes with return flow of used ethanol, while continuous stirring takes place. Thereupon the isoelectric point corresponding to fish protein, i. e., 5.4, is obtained by the addition of hydrochloric acid. The fluid constituent of the mass thus obtained is then either mechanically pressed and repeatedly rinsed with ethanol, or it is first dried by any other suitable means to about 10% content and subsequently rinsed repeatedly with ethanol. In both cases the rinsing with ethanol may be interrupted by intermediate, auxiliary dehydration operations. In both cases, the product, after being finally washed, is dried under vacuum.

(3) 100 grams of degreased fish mash obtained by grinding and drying under vacuum and at approximately 50° C. to 60° C. with about 40% protein content, are boiled with 200 grams of acetone for 30 minutes, while constantly stirred during application of heat. The liquid is then drawn off and the resultant mass is subjected to drying by centrifuging. The somewhat still moist mass is boiled with 200 grams of ethanol plus 2 grams of hydrochloric acid for about 50 minutes, a continuous stirring action being again maintained throughout this time. After obtaining the isoelectric point, the liquid mass is distilled off under vacuum to about 10% of said mass. Finally, the mass is again boiled with 200 grams of ethanol for about 30 minutes and then distilled to dryness under vacuum, not above 60° C., to prepare the resultant mass for food purposes.

By means of the process according to the invention the raw fish material (sea water, as well as sweet water fish), while retaining to a great extent its essential amino constituents, particularly the sulphurous amino acids, is free from all disagreeable odoriferous substances.

The technical effect, both in the case of the alkali method and of the acid method, is due to the fact that, by virtue of the treatment carried out with water soluble organic solvents, a medium having a relatively low content of water is produced and, consequently, the swelling of the resultant protein product in water during the preparation is repressed. As a result, there is avoided any hydrolytic reaction tending to destroy the amino acids, or to split up the proteins existing in free form in the product. The employment of temperatures up to the boiling point of the organic solvent results in heat-saving advantages which render the process economical for commercial use.

Under this process it has been found that a product of an extraordinarily high nutritive or biological value of 93.1% (determined by the nitrogen retention of Mitchell's method) in animal-feeding tests is obtained. According to tests carried out by the Department of Agricultural Chemistry (Experiment Station) of the University of Arkansas a true digestibility of 98.6% and a net protein utilization of 91.8% was found.

The effect of the process according to the invention can be characterized as follows: A raw fish material which, based on the raw protein, has a content of 1.5% volatile nitrogen bases, taken to be trimethylamine, forms a product which still contains about 0.2% or less of the above-mentioned bases. A surprising feature is also the high swelling capacity of the protein product obtained by the process of the invention. Whereas the fish meals hitherto known have scarcely any swelling capacity left, a protein product formed according to the invention, if fresh fish are used, on swelling in water with a pH-value of 6, attains a volume approaching that of fresh or dehydrated protein substance.

Thus, it may be seen that, according to a broad view of the present invention, there has been provided a process of preparing protein substances from fresh or substantially fresh fish and like edible sea animal material (the meat and/or bones and scales thereof), comprising the steps of reducing the fat content of said fish material to less than 4%, partially dehydrating said fish material, and subsequently treating the latter with an alkali or an acid in a water soluble organic solvent.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A process of preparing edible protein substances from raw fish material having a fat content of less than 4%, comprising the steps of partially dehydrating the fish material, heating the fish material in a solution of an alkali hydroxide in ethanol to remove the fishy smell and taste from said fish material, cooling the fish material in solution, then adding an acid in sufficient quantity to set the isoelectric point of the resultant product, and then drying the fish material.

2. A process for extracting a protein product from raw fish material, comprising the steps of treating said material with an organic solvent for reducing the fat content of said material to a range from approximately 0.5 to 4%, partially dehydrating said material, applying for about 30 minutes a solution of sodium hydroxide in ethanol at a temperature between 20° C. and 80° C., whereby the fishy smell and taste of the material are removed, adding hydrochloric acid in sufficient quantity to set the isoelectric point of the resultant product, and further subjecting the latter to drying operation at a temperature below 60° C.

3. The process according to claim 2, the maximum concentration of said sodium hydroxide being approximately 10%, based on the dry fish material.

4. The process according to claim 2, said step of applying said solution of sodium hydroxide in ethanol being carried out while said partially dehydrated material is maintained in a vacuum.

5. The process according to claim 2, said step of partially dehydrating said material comprising subjecting said material to the action of a water soluble organic solvent to thereby reduce the water content of said material by displacement to less than 50% of the initial total water weight.

6. The process according to claim 2, further including the step of applying a solution of an acid in ethanol at the said temperature between 20° C. and 80° C. subsequent to the application of said sodium hydroxide solution and prior to the addition of hydrochloric acid for setting the isoelectric point of said product.

7. The process according to claim 6, further including the step of repeating the aforesaid applications of said sodium hydroxide solution and said acid solution prior to the addition of said hydrochloric acid for setting said isoelectric point.

8. A process according to claim 2, said organic solvent being selected from the group consisting of benzene, methylenechloride and trichlorethylene.

References Cited in the file of this patent
UNITED STATES PATENTS 662,779    Eichelbaum ------------ Nov. 27, 1900